United States Patent Office 2,849,422
Patented Aug. 26, 1958

2,849,422

VINYL RESINS FOR APPLICATION AS SOLVENT SOLUTIONS

George P. Rowland, Jr., and Robert A. Piloni, Pottstown, Pa., assignors to The Firestone Tire & Rubber Company, Akron, Ohio, a corporation of Ohio No Drawing. Application January 13, 1956
Serial No. 558,844

14 Claims. (Cl. 260—78.5)

This invention relates to novel vinyl chloride interpolymer resins particularly adapted for dissolving in solvents for application as coatings, paints, lacquers, inks, adhesives, and the like.

Vinyl chloride resins, because of their cheapness, hardness, stability and other desirable properties have long been considered potentially desirable as coatings, paints, lacquers, adhesives, inks, and the like. Unfortunately, however, these resins are not soluble in cheap hydrocarbons; are not compatible with alkyd resins; and do not exhibit good adhesion to metallic and other surfaces. For these reasons, the use of vinyl chloride resins in these fields has been somewhat limited.

Accordingly, it is an object of this invention to provide novel vinyl chloride resins suitable as solvent-applied coatings, paints, lacquers, inks, adhesives, and the like.

Another object is to provide such resins which are soluble in cheap hydrocarbon solvents such as benzene, toluene, xylene, and the like.

A further object is to provide such resins having good compatibility with the alkyd resins.

A further object is to provide such resins which will have good adhesion to metallic surfaces.

SYNOPSIS OF THE INVENTION

The above and other objects are secured, in accordance with this invention, by subjecting to copolymerizing conditions a mixture comprising

| | Percent |
|---|---|
| Vinyl chloride | 55–75 |
| A di-(saturated hydrocarbon) maleate, chloromaleate, or fumarate containing 6–24 carbon atoms, or a mixture of esters of this type | 14–35 |
| A mono-(saturated hydrocarbon) monohydrogen maleate, chloromaleate, or fumarate containing 5–14 carbon atoms, or a mixture of esters of this type | 5–10 |
| An ethylenically unsaturated halogenated hydrocarbon other than those readily copolymerizable with vinyl chloride | 1–6.5 |

The percentages cited are all on the basis of the total weight of the mixtures. Resins produced from mixtures within the above compositional ranges have excellent solubility in hydrocarbon solvents, are stably compatible with alkyd resins, and have good adhesion to metals. In addition to these desirable and unique properties, they also preserve unimpaired the excellent general properties of conventional vinyl chloride resins, particularly their hardness and their good resistance to aging. The resins of this invention find particular application in coatings, such as paints, especially for outdoor-exposed metal equipment; as inks; and as adhesives.

THE MALEIC AND FUMARIC DIESTERS AND HALF-ESTERS

The maleic and fumaric dihydrocarbon esters, and monohydrocarbon monohydrogen half-esters employed as starting materials in the preparation of resins in accordance with this invention are esters, within the cited classes, in which the radicals esterified by the maleic or fumaric acid are hydrocarbon radicals which contain from 1 to 10 carbon atoms and are saturated, i. e., free from ethylenic unsaturation although they may contain aromatic groups. On this basis, the diesters will contain from 6 to 24 carbon atoms, and the half-esters will contain from 5 to 14 carbon atoms. Suitable hydrocarbon groups include methyl groups, ethyl groups, normal- and iso-propyl groups, normal-, secondary and tertiary butyl groups, the several amyl groups, n-hexyl groups, cyclohexyl groups, 2-ethyl hexyl groups, phenyl groups, benzyl groups, naphthyl groups, and the like. Specific exemplary diesters include dimethyl maleate, dimethyl fumarate, diethyl maleate, di-n-butyl maleate, di-n-butyl fumarate, di-n-propyl maleate, diisopropyl maleate, diisobutyl maleate, di-secondary butyl maleate, di(2-ethyl hexyl) maleate, di(cyclohexyl) maleate, and di-benzyl maleate. Suitable half-esters include methyl hydrogen maleate, n-butyl hydrogen maleate, n-butyl hydrogen fumarate, n-propyl hydrogen maleate, benzyl hydrogen maleate, cyclohexyl hydrogen maleate, and the like. The esters used need not be pure compounds; thus mixtures of suitable dialkyl maleates and/or fumarates and mixtures of suitable monoalkyl monohydrogen maleates or fumarates may be used in lieu of pure esters of these respective types. It will also be understood that the maleates and fumarates will be indistinguishable in the product resins, since their unsaturation will be obliterated in the polymerization. A particularly useful combination of a specific dihydrocarbon ester and monohydrogen monohydrocarbon ester has been found to be the combination of (A) a commercial material offered as di-n-butyl maleate but actually containing approximately equal proportions of di-n-butyl maleate and di-n-butyl fumarate and (B) mono-n-butyl monohydrogen maleate.

THE UNSATURATED HALOGENATED HYDROCARBONS

As set forth hereinabove, there may be employed any halogenated ethylenically unsaturated hydrocarbon which is not readily copolymerizable with vinyl chloride. Vinyl chloride itself, vinyl bromide, vinyl fluoride, vinyl iodide, vinylidene chloride, vinylidene bromide, vinylidene iodide, vinylidene chlorobromide, vinylidene chloroiodide, vinylidene bromoidide, vinylidene fluoroiodide, vinylidene fluorobromide, vinylidene fluorochloride, and trichloroethylene are thus to be excluded from the suitable unsaturated halohydrocarbons on this basis. Suitable unsaturated halogenated hydrocarbons other than those listed above as unsuitable will be seen to include for instance cis- and trans-1,2-dichloroethylene, cis- and trans-1,2-dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3 - dichloro - 1-propene, 3,3-dichloro-1-propene, 2,3-dibromo-1-propene, 1-chloro-2-butene, 1-chloro-2-decene, 1-chloro-2-octadecene, and the like. In general, it will be preferred to employ those unsaturated halogenated compounds containing from 1 to 4 carbon atoms, although higher molecular weight compounds may also be used. It will be understood that, instead of a single pure unsaturated halogenated hydrocarbon, there may be employed any mixture of such compounds which are individually suitable. If desired or necessary to remove the unsaturated halogenated compound at the completion of the polymerization, this can be done by means of vacuum drying, solvent extraction or the like. The exact function of these unsaturated halogenated hydrocarbons in the polymerization process of this invention is not fully understood; possibly they act as chain terminators or transfer agents, or perhaps they affect the growing polymer chains in some maner not yet elucidated. At any rate, polymers prepared in the absence of these materials do not possess the desirable properties set forth hereinabove as characterizing the products produced in accordance with this invention.

THE PREPARATION OF THE INTERPOLYMERS OF THE INVENTION

The interpolymers of this invention may be prepared by mixing together the several starting materials and subjecting them to any of the usual free-radical polymerization systems and conditions, for instance in solution in solvents, and in emulsion in aqueous media, using free-radical-generating catalysts and conditions. In practical production, however, it will usually be preferred to polymerize these materials in suspension in aqueous media by the known suspension polymerization technique. In general this technique involves suspending the monomers in an aqueous medium containing non-micelle-forming suspending agents. Suspending agents suitable for this purpose are hydrophilic high polymeric materials such as gelatin, polyvinyl alcohol, polyacrylic acid, polymaleic acid, methyl cellulose, and the like. The aqueous medium constitutes about at least half of the entire polymerization mass. The reaction is promoted by the presence of free-radical-generating agents soluble in the monomer phase of the suspension, such as benzoyl peroxide, perbenzoic acid, p-chlorobenzyl peroxide, t-butyl hydroperoxide and the like. The aqueous phase and the monomer phase are agitated together so as to suspend the latter in the former, and the temperature of the mass is adjusted to values such as to initiate the polymerization reaction, usually on the order of 30°–100° C. The monomers in the suspended droplets become polymerized, yielding a suspension of granular resin in the aqueous medium. From this aqueous suspension the resin is isolated by filtration.

PROPERTIES AND USES OF THE RESINS OF THIS INVENTION

The resins of this invention are soluble in cheap aromatic hydrocarbon solvents such as benzene, toluene, xylene, and the like in substantial proportions, say up to 30% of the total weight of the solution. Coatings formed from these solutions upon metallic and other surfaces are highly adhesive thereto and are not easily removed by abrasion or flexure of the substrate. The resins of this invention are compatible with the alkyd resins, both in solvent solutions and also in the dried films produced from solvent solutions of mixtures of the resins of this invention with alkyd resins. The resins of this invention accordingly find extensive use in coating compositions such as paints for use on metallic and other surfaces, particularly in coatings for metallic equipment subject to outside exposure conditions such as railway vehicles, automobiles, tractors, vending and dispensing machinery and the like. The resins of this invention are also very suitable for use in solvent-based inks for printing upon plastic and other surfaces. In view of their excellent adhesion to a wide variety of surfaces, the resins of this invention are further admirably adapted for use in the formulation of adhesives for joining metal, wood, plastics, and the like.

With the foregoing general discussion in mind, there are given herewith detailed examples of the practice of this invention. All parts given are by weight.

Example

| | | |
|---|---|---|
| Water (deionized) | parts | 120 |
| Vinyl chloride | do | 42 |
| Commercial n-dibutyl maleate (containing n-dibutyl fumarate to the extent of approximately 40–50%) | do | 13 |
| Mono-n-butyl monohydrogen maleate | do | 5 |
| Gelatin | do | 0.5 |
| Chlorinated unsaturated hydrocarbon (per Table I) | Per Table I | |

A series of polymerization runs was made in accordance with this invention, using various chlorinated hydrocarbons in the amounts set forth in Table I. In each case the materials were charged into a reactor (previously purged with nitrogen) and polymerized with agitation at 65° C. for 24 hours. The resultant suspension of resin was filtered to recover the resin, which was washed on the filter with water and dried.

Each resin was made up into a 35% solution in methyl ethyl ketone. All of the resins gave clear solutions at this concentration. Each resin was tested for adhesion to metal by coating a cleaned steel strip with the 35% resin solution, drying for 24 hours and then scraping with a knife. Excellent adhesion was obtained in each case. Finally each resin was tested for compatibility with alkyd resin by dissolving 20 grams of an alkyd resin (Glidden Co. resin 2KB551) in 20 grams of the 35% solution of the vinyl chloride resin prepared as above described. A microscope slide was dipped into the solution of alkyd and vinyl chloride resins, and dried for 24 hours. A perfectly clear film was obtained in each case. Likewise, the relative viscosity of each of the resins, in 1% cyclohexanone solution, was determined for each. Following are the particulars of the several poly merization runs.

TABLE I

| Halogenated hydrocarbon | | Benzoyl peroxide used (parts) | Relative viscosity | Run No. |
|---|---|---|---|---|
| Name | Parts used | | | |
| Allyl chloride* | 4 | 1 | 1.31 | 1 |
| 1,2-dichloroethylene* (mixed cis and trans) | 2 | 1 | 1.33 | 2 |
| Methallyl chloride | 3 | 0.5 | 1.27 | 3 |
| Tetrachloroethylene | 3 | 0.5 | 1.33 | 4 |

*1 part of benzoyl peroxide was used in these runs.

In those of the above runs in which 4 parts of the unsaturated halogenated hydrocarbon were used, the ratio of vinyl chloride/dibutyl ester/monobutyl ester/halogenated hydrocarbon was 65.7/20.3/7.8/6.2; when 2 parts were used, 67.8/20.9/8.1/3.2; and when 3 parts were used 66.7/20.6/7.9/4.8.

From the foregoing general discussion and detailed specific example, it will be evident that this invention provides novel vinyl chloride resins admirably suited for applications involving solutions in aromatic hydrocarbon solvents as in coatings, lacquers, paints, inks, adhesives and the like The resins are all characterized by good compatibility with alkyd resins and good adhesion to metallic and other surfaces.

What is claimed is:

1. Process which comprises subjecting, to a free-radical-generating catalyst and free-radical polymerizing conditions a mixture consisting of

| | Percent |
|---|---|
| Vinyl chloride | 55–75 |
| A di-(saturated hydrocarbon) diester of an acid selected from the group consisting of maleic chloromaleic and fumaric acids containing 6–24 carbon atoms | 14–35 |
| A mono-(saturated hydrocarbon) monohydrogen ester of an acid selected from the group consisting of maleic chloromaleic and fumaric acids containing 5–14 carbon atoms | 5–10 |
| A halogenated unsaturated compound selected from the group consisting of cis- and trans-1,2-dichloroethylene, cis- and trans-1,2-dibromoethylene, tetrachloroethylene, tetrabromooethylene, 1,1.-dichloro-2-bromoethylene, allyl chloride, methallyl chloride, allyl bromide, allyl iodide, methallyl bromide, methallyl iodide, 2,3-dichloro-1-propene, 3,3-dichloro-1-propene, 2,3-dibromo-1-propene, 1-chloro-2-butene, 1-chloro-2-decene and 1-chloro-2-octadecene | 1.0–6.5 | the percentages being based on the total weight of said mixture.

2. Process which comprises subjecting, to a free-radicalgenerating catalyst and free-radical polymerizing conditions a mixture consisting of

| | Percent |
|---|---|
| Vinyl chloride | 55–75 |
| A mixture of di-n-butyl maleate and di-n-butyl fumarate in approximately equal proportions | 14–35 |
| A mono-(saturated hydrocarbon) monohydrogen ester of an acid selected from the group consisting of maleic chloromaleic and fumaric acids containing 5–14 carbon atoms | 5–10 |
| A halogenated unsaturated compound selected from the group consisting of cis- and trans-1,2-dichloroethylene, cis- and trans-1,2-dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3-dichloro-1-propene, 3,3-dichloro-1-propene, 2,3-dibromo-1-propene, 1-chloro-2-butene, 1-chloro-2-decene and 1-chloro-2-octadecene | 1.0–6.5 | the percentages being based on the total weight of said mixture.

3. Process which comprises subjecting, to a free-radical-generating catalyst and free-radical polymerizing conditions a mixture consisting of

| | Percent |
|---|---|
| Vinyl chloride | 55–75 |
| A di-(saturated hydrocarbon) diester of an acid selected from the group consisting of maleic chloromaleic and fumaric acids containing 6–24 carbon atoms | 14–35 |
| Mono-n-butyl monohydrogen maleate | 5–10 |
| A halogenated unsaturated compound selected from the group consisting of cis- and trans-1,2-dichloroethylene, cis- and trans-1,2-dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3-dichloro-1-propene, 3,3-dichloro-1-propene, 2,3-dibromo-1-propene, 1-chloro-2-butene, 1-chloro-2-decene and 1-chloro-2-octadecene | 1.0–6.5 | the percentages being based on the total weight of said mixture.

4. Process which comprises subjecting, to a free-radical-generating catalyst and free-radical polymerizing conditions a mixture consisting of

| | Percent |
|---|---|
| Vinyl chloride | 55–75 |
| A mixture of di-n-butyl maleate and di-n-butyl fumarate in approximately equal proportions | 14–35 |
| Mono-n-butyl monohydrogen maleate | 5–10 |
| A halogenated unsaturated compound selected from the group consisting of cis- and trans-1,2-dichloroethylene, cis- and trans-1,2-dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3-dichloro-1-propene, 3,3-dichloro-1-propene, 2,3-dibromo-1-propene, 1-chloro-2-butene, 1-chloro-2-decene and 1-chloro-2-octadecene | 1.0–6.5 | the percentages being based on the total weight of said mixture.

5. Process which comprises subjecting, to a free-radical-generating-catalyst and free-radical polymerizing conditions a mixture consisting of

| | Percent |
|---|---|
| Vinyl chloride | 65.7 |
| A mixture of di-n-butyl maleate and di-n-butyl fumarate in approximately equal proportions | 20.3 |
| Mono-n-butyl monohydrogen maleate | 7.8 |
| A halogenated unsaturated compound selected from the group consisting of cis- and trans-1,2-dichloroethylene, cis- and trans-1,2-dibromoethylene, tetrachloroethylene, tetrabromoethylene, 1,1-dichloro-2-bromoethylene, allyl chloride, methallyl chloride, allyl bromide, allyl iodide, methallyl bromide, methallyl iodide, 2,3-dichloro-1-propene, 3,3-dichloro-1-propene, 2,3-dibromo-1-propene, 1-chloro-2-butene, 1-chloro-2-decene and 1-chloro-2-octadecene | 6.2 | the percentages being based on the total weight of said mixture.

6. Process which comprises subjecting, to a free-radical-generating catalyst and free-radical polymerizing conditions a mixture consisting of

| | Percent |
|---|---|
| Vinyl chloride | 65.7 |
| A mixture of di-n-butyl maleate and di-n-butyl fumarate in approximately equal proportions | 20.3 |
| Mono-n-butyl monohydrogen maleate | 7.8 |
| Allyl chloride | 6.2 | the percentages being based on the total weight of said mixture.

7. Process which comprises subjecting, to a free-radical-generating catalyst and free-radical polymerizing conditions a mixture consisting of

| | Percent |
|---|---|
| Vinyl chloride | 67.8 |
| A mixture of di-n-butyl maleate and di-n-butyl fumarate in approximately equal proportions | 20.9 |
| Mono-n-butyl monohydrogen maleate | 8.1 |
| 1,2-dichloroethylene | 3.2 | the percentages being based on the total weight of said mixture.

8. Process which comprises subjecting, to a free-radical-generating catalyst and free-radical polymerizing conditions a mixture consisting of

| | Percent |
|---|---|
| Vinyl chloride | 66.7 |
| A mixture of di-n-butyl maleate and di-ni-butyl fumarate in approximately equal proportions | 20.6 |
| Mono-n-butyl monohydrogen maleate | 7.9 |
| Methallyl chloride | 4.8 | the percentages being based on the total weight of said mixture.

9. Process which comprises subjecting, to a free-radical-generating catalyst and free-radical polymerizing conditions a mixture consisting of

| | Percent |
|---|---|
| Vinyl chloride | 66.7 |
| A mixture of di-n-butyl maleate and di-n-butyl fumarate in approximately equal proportions | 20.6 |
| Mono-n-butyl monohydrogen maleate | 7.9 |
| Tetrachloroethylene | 4.8 | the percentages being based on the total weight of said mixture.

10. A vinyl chloride resin, characterized by excellent solubility in organic solvents, compatibility with alkyd resins and adhesion to metals, said resin having been prepared by the process of claim 1.

11. A vinyl chloride resin, characterized by excellent solubility in organic solvents, compatibility with alkyd resins and adhesion to metals, said resin having been prepared by the process of claim 6.

12. A vinyl chloride resin, characterized by excellent solubility in organic solvents, compatibility with alkyd resins and adhesion to metals, said resin having been prepared by the process of claim 7.

13. A vinyl chloride resin, characterized by excellent solubility in organic solvents, compatibility with alkyd resins and adhesion to metals, said resin having been prepared by the process of claim 8.

14. A vinyl chloride resin, characterized by excellent solubility in organic solvents, compatibility with alkyd resins and adhesion to metals, said resin having been prepared by the process of claim 9.

References Cited in the file of this patent

UNITED STATES PATENTS

Re. 24,206    Rowland et al. _____ Aug. 28, 1956

OTHER REFERENCES

Schildknecht: Polymer Processes, Interscience (1956), pages 178–179.

UNITED STATES PATENT OFFICE
CERTIFICATE OF CORRECTION

Patent No. 2,849,422                                    August 26, 1958

George P. Rowland, Jr., et al.

It is hereby certified that error appears in the printed specification of the above numbered patent requiring correction and that the said Letters Patent should read as corrected below.

Column 3, line 7, for "OF THE INVENTION" read -- OF THIS INVENTION --; between lines 72 and 73 insert the following item in the recipe:

Benzoyl peroxide ---- do - - - 0.5 column 4, line 52, after "like" insert a period.

Signed and sealed this 6th day of October 1959.

(SEAL)

Attest:

KARL H. AXLINE
Attesting Officer

ROBERT C. WATSON
Commissioner of Patents